(No Model.) 2 Sheets—Sheet 1.

A. W. HOFMANN.
MEANS FOR ORNAMENTING WATCH CASE CENTERS AND OTHER LIKE ARTICLES.

No. 435,834. Patented Sept. 2, 1890.

Witnesses
Chas. R. Burr
Thomas Durant

Inventor
Adolph W. Hofmann
by Wright, Brown & Crossley,
his Attorneys.

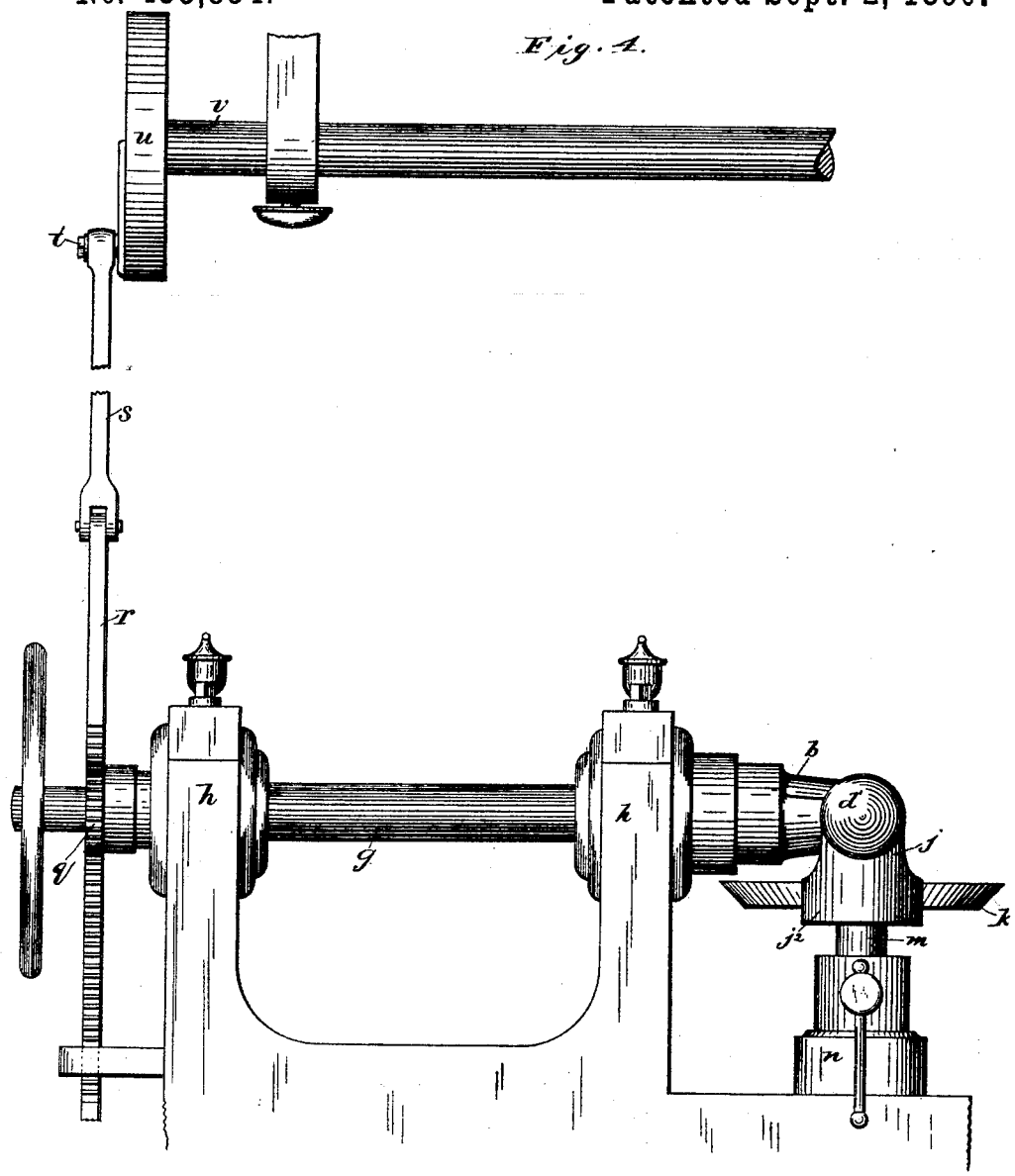

UNITED STATES PATENT OFFICE.

ADOLPH W. HOFMANN, OF BROOKLYN, ASSIGNOR TO ROBBINS & APPLETON, OF NEW YORK, N. Y.

MEANS FOR ORNAMENTING WATCH-CASE CENTERS AND OTHER LIKE ARTICLES.

SPECIFICATION forming part of Letters Patent No. 435,834, dated September 2, 1890.

Application filed December 31, 1887. Serial No. 259,495. (No model.)

*To all whom it may concern:*

Be it known that I, ADOLPH W. HOFMANN, of Brooklyn, in the county of Kings and State of New York, have invented certain new and useful Improvements in Means for Ornamenting Watch-Case Centers and other Like Articles, of which the following is a specification.

This invention has for its object to provide improved means for ornamenting the peripheries of watch-case centers; and it consists in the combination of a rotary chuck adapted to hold a case-center, a laterally-movable embossing-roll and supporting devices therefor, whereby the roll may be kept in rolling contact with the periphery of the case-center, and means for reversely rotating said chuck and the case-center, and thereby causing the embossing-roll to follow during each successive movement of the case-center the impressions made by it during the preceding movement, as I will now proceed to describe.

Figure 1:
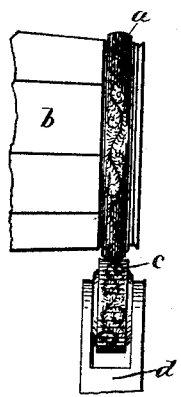
Figure 2:
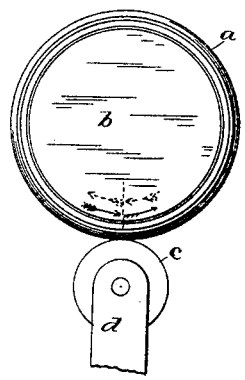
Figure 3:
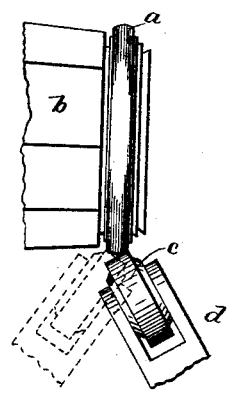
Figure 5:
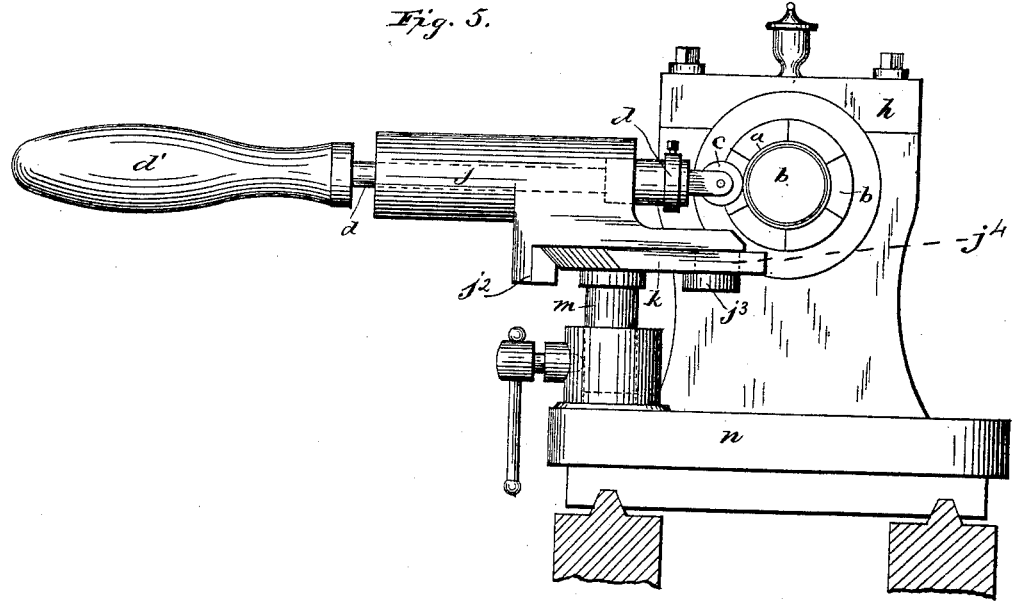

In the accompanying drawings, forming a part of this specification, Figure 1 represents a top view of the embossing-roll, a case-center to which the roll is presented, and a part of the rocking or reversely rotating chuck which holds the case-center. Fig. 2 represents a side view of the same. Fig. 3 represents a top view showing the range of lateral movement of the embossing-roll. Fig. 4 represents a side elevation showing a lathe head-stock holding the chuck, a slide rest supporting the embossing-roll, and the means for reversely rotating the chuck. Fig. 5 represents an end view of the head-stock, chuck, embossing-roll, and the holder for the latter.

The same letters of reference indicate the same parts in all the figures.

In the drawings, $b$ represents a chuck formed in any suitable way to hold a case-center $a$. Said chuck is attached to a shaft or spindle $g$, which is journaled in bearings $h\ h$.

$c$ represents an embossing-roll or die having its periphery engraved or otherwise treated to enable it to emboss the desired design on the periphery of the case-center. Said roll is journaled in a rod $d$, adapted to slide in a holder or sleeve $j$, which is formed onto a base $j'$. Said base is pivotally connected to a fixed plate $k$, so that the holder $j$, rod $d$, and roll $c$ may be moved to give the roll the positions shown in full and dotted lines in Fig. 3, and any intermediate positions, the base $j'$ having a lug $j^3$ which fits and is adapted to turn in a curved recess $j^4$ in the plate $k$, while the rear side of the base has a beveled lug $j^2$, which bears against the curved and beveled rear side of the plate $k$, the whole arrangement being such as to enable the base $j'$ to oscillate or move laterally on a center which enables the roll to be moved over the convex surface of the case-center, as indicated by Fig. 3. The plate $k$ is attached to a post $m$, which is supported by a bed-plate $n$.

The mechanism thus far described is not new, and is such as is commonly used in ornamenting the peripheries of watch-case centers, the roll $c$ being pressed against the periphery of the case-center by pressure of the operator on a handle $d'$ on the rod $d$, while the case-center is being rotated by the rotation of the chuck; but in all cases heretofore, so far as I am aware, the chuck has been continuously rotated.

In carrying out my invention I combine with the devices above described means for rocking or reversely rotating the chuck and positively limiting or defining its movements in each direction, or, in other words, rotating it first in one direction and then in the opposite direction to a predetermined extent, instead of continuously rotating it, as heretofore. To this end I have secured to the shaft $g$ a gear $q$, and connected said shaft with the counter-shaft $v$ by means of a rack $r$ meshing with said gear and a pitman $s$, connecting said rack with an eccentric wrist-pin $t$ on a crank-wheel $u$, affixed to the counter-shaft. The rotation of the counter-shaft is thus caused to rock or reversely rotate the shaft $g$ and the chuck $b$ attached thereto and give each movement a fixed length or extent, as will be readily seen. The wrist-pin $t$ should be adjustable, so that the length of the rocking motions of the shaft $g$ and chuck $b$ may be adjusted.

As before stated, it is not new to continuously rotate a watch-case center and at the same time to hold an ornamenting-roll in rolling contact therewith; but I am the first, so far as I am aware, to combine with a rotary chuck and a laterally-movable embossing-roll means for imparting reversing or rocking movements of predetermined lengths to said chuck. When the case-center is continuously rotated, a roll must be used the periphery of which is formed to make regular or set figures—such as crossed diagonal grooves or parallel grooves either diagonal to the axis of the center or parallel therewith—because substantially such is the only formation which will enable the projections of the roll driving each successive rotation of the case-center to catch into or coincide with the indentations formed in the case-center during the preceding rotation. All ornamentation therefore produced heretofore by the rolling contact of rolls with the rotating peripheries of case-centers has been necessarily confined to regular patterns such as are above indicated, it being impossible to produce by continuous rotation any pattern having irregular curved lines resembling hand-work—such, for example, as the chasing or "vermicelli" work shown in Fig. 1, because the relief-lines formed on the roll cannot catch into the previous or initial impressions made by them when the case-center is continuously rotated. By the rocking or reversing rotation of the case-center, however, there is no possibility of failure of the relief-lines of the roll to catch into or coincide with the impressions previously made in the case-center, each relief-line of the roll remaining in the groove formed by it in the case-center, when the rotation of the latter is stopped and reversed, so that the relief-lines of the roll are always in operative engagement with the impressions in the case-center. I make each movement of the case-center not more than a complete rotation, so that there will be no encroachment of the impressions formed during one movement of the case-cen-
ter upon those formed during the opposite movement. Each movement may be less than a complete rotation if it is desirable to have the roll act on only a part of the periphery of the case-center.

I do not limit myself to the particular devices herein described for rocking the chuck-holding shaft and the case-center, but may use any suitable means which a mechanic might select.

Finger-rings or other articles of like form may be ornamented by the described means.

The method of ornamenting by reversely rotating the article to be ornamented, continuously holding an embossing-die in engagement with it, and laterally moving or inclining said die is claimed in another application filed by me December 31, 1887, Serial No. 259,496.

I claim—

1. The combination of a rotary embossing roll or die having an engraved periphery, a pivoted holder whereby said die may be inclined or moved laterally, a work-holder or chuck, and means for imparting to said chuck reversing rotary movements of predetermined length and thereby keeping the relief-lines of the die in operative engagement with the impressions made by it in the case-center or other article held by the chuck, as set forth.

2. The combination, with the embossing-roll, its holding devices, and the chuck $b$, of the gear $q$, affixed to the shaft carrying said chuck, the rack $r$ engaged with said gear, the counter-shaft $v$, and the pitman $s$, connecting said rack with an eccentric wrist-pin on a crank-wheel on the shaft, as set forth.

In testimony whereof I have hereto signed my name to this specification, in the presence of two subscribing witnesses, this 27th day of December, 1887.

ADOLPH W. HOFMANN.

Witnesses:
C. F. BROWN,
J. E. SEARING.